United States Patent
Bauer et al.

(10) Patent No.: US 10,161,300 B2
(45) Date of Patent: Dec. 25, 2018

(54) INTERNAL COMBUSTION ENGINE SYSTEM

(71) Applicant: VOLVO TRUCK CORPORATION, Göteborg (SE)

(72) Inventors: Martin Bauer, Anderslöv (SE); Ulf Aronsson, Lund (SE)

(73) Assignee: Volvo Truck Corporation, Göteborg (SE)

( * ) Notice: Subject to any disclaimer, the term of this patent is extended or adjusted under 35 U.S.C. 154(b) by 137 days.

(21) Appl. No.: 15/106,189

(22) PCT Filed: Dec. 19, 2013

(86) PCT No.: PCT/EP2013/003859
§ 371 (c)(1),
(2) Date: Jun. 17, 2016

(87) PCT Pub. No.: WO2015/090343
PCT Pub. Date: Jun. 25, 2015

(65) Prior Publication Data
US 2016/0333773 A1    Nov. 17, 2016

(51) Int. Cl.
*F02B 33/44*    (2006.01)
*F02B 33/00*    (2006.01)
(Continued)

(52) U.S. Cl.
CPC .......... *F02B 37/004* (2013.01); *F02B 37/013* (2013.01); *F02B 37/164* (2013.01);
(Continued)

(58) Field of Classification Search
CPC .... F02B 37/004; F02B 37/013; F02B 37/164; F02B 41/00; F02B 41/10; F02B 33/00;
(Continued)

(56) References Cited

U.S. PATENT DOCUMENTS 2,342,989 A * 2/1944 Ware ....................... F16F 15/14
                                                    464/65.1
2,400,830 A * 5/1946 Kinnucan ............... F02B 33/00
                                                    123/561

(Continued)

FOREIGN PATENT DOCUMENTS

AT           512 073 A1     5/2013
DE    10 2011 018570 A1    10/2012

(Continued)

OTHER PUBLICATIONS

International Search Report (dated Feb. 27, 2014) for corresponding Intenrational App. PCT/EP2013/003859.

(Continued)

*Primary Examiner* — Thai Ba Trieu
(74) *Attorney, Agent, or Firm* — WRB-IP LLP (57) ABSTRACT

An internal combustion engine system includes an internal combustion engine, an exhaust system, an exhaust gas recirculation circuit and a turbocharger including a first turbine interacting with a first compressor for charging air to the internal combustion engine. An exhaust gas recirculation passage is arranged to divert exhaust gases from the internal combustion engine upstream the first turbine and to debouch the exhaust gases downstream the first compressor. The internal combustion engine includes a bleed air channel which is located to divert compressed air at a location in or down¬stream from the first compressor and upstream of the internal combustion engine. A second turbine is arranged for receiving bleed air from the bleed air channel to recover energy from the bleed air channel. A vehicle including such an internal combustion engine system is also provided.

29 Claims, 3 Drawing Sheets

(51) Int. Cl.

| | | |
|---|---|---|
| *F02M 25/07* | (2006.01) | |
| *F02B 37/00* | (2006.01) | |
| *F02B 37/013* | (2006.01) | |
| *F02B 37/16* | (2006.01) | |
| *F02B 41/00* | (2006.01) | |
| *F02B 41/10* | (2006.01) | |
| *F02M 26/08* | (2016.01) | |
| *F02M 26/27* | (2016.01) | |
| *F02D 41/00* | (2006.01) | |
| *F02M 26/43* | (2016.01) | |
| *F02M 26/28* | (2016.01) | |
| *F02M 26/24* | (2016.01) | |

(52) U.S. Cl.
CPC .............. *F02B 41/00* (2013.01); *F02B 41/10* (2013.01); *F02D 41/0007* (2013.01); *F02M 26/08* (2016.02); *F02M 26/27* (2016.02); *F02M 26/24* (2016.02); *F02M 26/28* (2016.02); *F02M 26/43* (2016.02); *Y02T 10/144* (2013.01); *Y02T 10/16* (2013.01); *Y02T 10/163* (2013.01)

(58) Field of Classification Search
CPC .... F02D 41/0007; F02M 26/08; F02M 26/27; F02M 26/24; F02M 26/43; Y02T 10/144; Y02T 10/16; F16D 3/60; F16F 15/14; F01K 23/065
USPC ... 60/597, 599, 605.1, 605.2, 611, 612, 614, 60/624; 123/561–562
See application file for complete search history.

(56) References Cited

U.S. PATENT DOCUMENTS

| | | | | |
|---|---|---|---|---|
| 2,653,457 | A * | 9/1953 | Guernsey | F16D 3/60 |
| | | | | 464/69 |
| 6,324,846 | B1 | 12/2001 | Clarke | |
| 7,010,914 | B1 * | 3/2006 | Roberts, Jr. | F02B 37/16 |
| | | | | 60/611 |
| 7,080,511 | B1 * | 7/2006 | Bolton | F02D 41/0007 |
| | | | | 60/611 |
| 7,254,948 | B2 * | 8/2007 | Gustafson | F02B 37/16 |
| | | | | 60/611 |
| 2001/0035171 | A1 * | 11/2001 | Kim | F02M 26/19 |
| | | | | 60/605.2 |
| 2011/0146271 | A1 * | 6/2011 | Carter | F01D 5/026 |
| | | | | 60/605.1 |
| 2011/0265471 | A1 * | 11/2011 | Grissom | F02B 37/013 |
| | | | | 60/598 |
| 2012/0124992 | A1 | 5/2012 | Fiveland | |
| 2012/0198839 | A1 * | 8/2012 | Nelson | F01K 23/065 |
| | | | | 60/605.1 |
| 2013/0081392 | A1 * | 4/2013 | Klingbeil | F02D 23/00 |
| | | | | 60/605.2 |
| 2013/0098030 | A1 * | 4/2013 | Freund | F02M 26/27 |
| | | | | 60/599 |
| 2013/0098031 | A1 | 4/2013 | Petrovic et al. | |
| 2013/0232972 | A1 * | 9/2013 | Heiermann | F02B 37/013 |
| | | | | 60/605.2 |
| 2013/0283784 | A1 * | 10/2013 | Uzkan | F01K 23/065 |
| | | | | 60/618 |
| 2014/0034002 | A1 * | 2/2014 | Bromberg | F02D 41/0027 |
| | | | | 123/1 A |
| 2014/0230436 | A1 * | 8/2014 | Wong | F02B 33/40 |
| | | | | 60/597 |
| 2015/0000269 | A1 * | 1/2015 | Zhuge | F02B 29/04 |
| | | | | 60/599 |
| 2015/0083056 | A1 * | 3/2015 | Lejeune | F01K 23/065 |
| | | | | 123/22 |
| 2017/0260889 | A1 * | 9/2017 | Zhou | F02B 33/40 |
| 2018/0142610 | A1 * | 5/2018 | Colliou | F02B 37/025 |

FOREIGN PATENT DOCUMENTS

| | | | | |
|---|---|---|---|---|
| EP | 1 138 928 | A2 | 10/2001 | |
| EP | 1 916 397 | A1 | 4/2008 | |
| JP | 02009906 | A * | 1/1990 | ............. F02B 37/00 |
| JP | H08260994 | | 10/1996 | |
| JP | 2004515715 | A | 5/2004 | |
| JP | 2011174404 | A * | 9/2011 | ........... Y02T 10/144 |
| JP | 2011220324 | A | 11/2011 | |
| JP | 2013133776 | A | 7/2013 | |
| JP | 2013117825 | A | 9/2013 | |
| JP | 2013199902 | A | 10/2013 | |
| JP | 2013217382 | A | 10/2013 | |

OTHER PUBLICATIONS

International Preliminary Report on Patentability (dated Dec. 4, 2015) for corresponding Intenrational App. PCT/EP2013/003859.
Japanese Official Action (dated Oct. 30, 2017) for corresponding Japanese App. JP 2016-541127.

* cited by examiner

INTERNAL COMBUSTION ENGINE SYSTEM

BACKGROUND AND SUMMARY

The present disclosure relates to an internal combustion engine system comprising an internal combustion engine, an exhaust system, an exhaust gas recirculation circuit and a turbocharger comprising a first turbine interacting with a first compressor for charging air to the internal combustion engine. An exhaust gas recirculation passage is arranged to divert exhaust gases from the internal combustion engine upstream the first turbine and to debouch the exhaust gases downstream the first compressor. The present disclosure also relates to a vehicle comprising such an internal combustion engine system.

It is well known to provide an internal combustion engine with a turbocharger, i.e. with a turbine and a compressor. Certain engines are even provided with a dual stage turbocharger comprising generally a low pressure and a high pressure turbine and a low pressure and a high pressure compressor, both connected in series. The reason for doing so is generally to supply the combustion with more air in order to make the engine more efficient and provide more power.

When driving at high altitude the air pressure produced by the turbocharger for the engine may not be sufficient to provide adequate power to the vehicle. When the engine determines that the vehicle is driving at high altitude, the turbocharger is speeding up to provide more air to the engine. When doing so the turbocharger runs the risk of over speed. Additionally, at higher altitudes ambient air may be so thin that the pressurisation in the turbocharger may still not be sufficient. These high altitudes may be at e.g. 1500 m and up to 3000 m depending on for which part of the world the vehicle is destined. It may be desirable for vehicles to perform equally well, or at least not much poorer at these raised altitudes than at sea level.

An internal combustion engine may also be provided with an exhaust gas recirculation system, an EGR system, in order to lower combustion temperatures and thereby reduce the emissions from the engine. It is well known that fuel reduction and exhaust emissions are two of the major challenges for the present time vehicle development.

For an engine having an EGR system it has also been known to provide it with a turbocharger in which the turbine work is reduced either through throttling or through by-passing the turbine, since otherwise the pressure balance between the intake and the exhaust side of the engine may be disadvantageous for the EGR system. Such a system preferably should have a lower pressure at the intake side of the engine in comparison to at the exhaust side of the engine for successfully delivering a part flow of exhaust gases from the exhaust side to the intake side.

A document disclosing a so called short route EGR in combination with a turbocharger is US 2012/0124992 A1. This document discloses a power source connected to an exhaust passage in which a turbine is connected to a compressor. The power system also discloses an exhaust gas recirculation passage comprising an EGR cooler. The document focuses on regulating the temperature in the EGR cooler in order to better adapt the temperature of the recirculated exhaust gases for proper combustion. This is done through the addition of a second compressor which supplies compressed air to the EGR cooler. The second compressor is either connected to the same turbine as the first compressor, or to a separate second turbine.

It is desirable to further improve the drivability, especially at high altitudes, and to improve the efficiency of the internal combustion engines in vehicles, in particular for heavy duty trucks.

According to a first aspect of the present disclosure an internal combustion engine system is disclosed which comprises an internal combustion engine, an exhaust system, an exhaust gas recirculation circuit and turbocharger comprising a first turbine interacting with a first compressor for charging air to the internal combustion engine. An exhaust gas recirculation passage is arranged to divert exhaust gases from the internal combustion engine upstream the first turbine and to debouch the exhaust gases downstream the first compressor. The internal combustion engine system comprises a bleed air channel which is located to divert compressed air at a location in or downstream from the first compressor and upstream of the internal combustion engine. A second turbine is arranged for receiving bleed air from the bleed air channel to recover energy from the bleed air channel.

By an internal combustion engine system of this kind several advantageous effects are achieved. The positive effects of having a turbocharger and an EGR system are maintained so that an efficient combustion at low temperature in the internal combustion engine is maintained, which in turn results in reduced exhaust emissions. Furthermore the internal combustion engine system also provides good drivability at high altitudes and a good adaptation between driving at normal and at raised altitudes. This is achieved through the use of a first turbine which is used in its whole capacity and which thus is in need of less throttling or other kind of performance reduction means. The possibly redundant capacity, or overcapacity, delivered from the first turbine is instead used in the first compressor to deliver bleed air through the bleed air channel to recover the thus produced redundant energy in the second turbine. As a consequence of this a better utilisation of the capacity of the first turbine is combined with a recovering of energy from it such that better fuel economy is achieved.

Also, since the bleed air channel is located in or downstream the first compressor and upstream the internal combustion engine, and the first compressor is the one delivering compressed air also to the internal combustion engine, a compact internal combustion engine system is achieved, without additional or unnecessary devices which not only are voluminous in a compartment which is very limited in space, but which also adds costs in terms of material, production and maintenance. Finally, such additional devices add friction and the demand for propulsion energy from the internal combustion engine, such that fewer devices will improve the overall efficiency of the system.

According to an embodiment the bleed air channel is directed for heat exchange with a waste heat source originating from the internal combustion engine. The internal combustion engine system produces a fairly extensive amount of energy which is not used for propulsion of the vehicle. This energy is mainly dissipated as heat. This waste heat may preferably be used to deliver energy to other devices of the internal combustion engine system instead of merely be relieved to the ambient. According to this embodiment at least a part of this waste heat is used for heat exchange with the bleed air channel such that this energy may also be recovered in the second turbine.

According to an embodiment the waste heat source is an exhaust gas heat source. A major contributor of waste heat in the internal combustion energy system is the combustion of fuel in the internal combustion engine. When the bleed air channel is made to interact through heat exchange with an exhaust gas heat source of the internal combustion engine an increased recovery of energy may be achieved.

According to an embodiment the waste heat source is the exhaust gas recirculation circuit. Heat exchange with the exhaust gas recirculation circuit means that heat energy therein is at least partially removed and delivered to the bleed air channel, where it may be recovered. The additional effect of this embodiment, on top of the advantage of recovering energy, is that the temperature of the exhaust gases in the exhaust gas recirculation circuit is lowered. Hereby the cooling effect of the exhaust gas recirculation circuit is improved and the combustion temperature in the internal combustion engine will be further lowered. This in turn leads to less emission from the combustion, such as of NOx and soot.

According to an embodiment the waste heat source is any other exhaust gas heat source than the exhaust gas recirculation circuit. Such sources may be the exhaust sys-tem, any exhaust gas after treatment systems connected to the exhaust system, or any other available source of waste heat.

According to an embodiment the exhaust gas recirculation circuit comprises an exhaust gas recirculation cooler, and the bleed air channel is directed through the exhaust gas recirculation cooler for heat exchange therein with the exhaust gases. For improved performance of the exhaust gas recirculation circuit it is advantageous to add an exhaust gas recirculation cooler in order to further cool down the temperature of the exhaust gases which are delivered to the intake manifold of the internal combustion engine. The heat dissipated in the exhaust gas recirculation cooler may thus advantageously be used for heat exchange with the bleed air channel in order to recover the dissipated waste heat. The exhaust gas recirculation cooler is in such a case already located within the internal combustion engine system and it merely entails redesigning it for heat exchange with the bleed air channel to achieve the advantageous effect.

According to an embodiment a regulating valve is located on the bleed air channel for regulating an amount of bleed air through the bleed air channel. Such a regulating valve adds the possibility of regulating the amount of compressed air which is delivered either to the internal combustion engine or to the bleed air channel for recovering of the energy. This way the internal combustion engine system is given the advantage of improved adaptation to ambient conditions, such as the ambient air pressure. When driving at high altitudes, the regulating valve may during extreme conditions fully block any com-pressed air from entering the bleed air channel, such that all compressed air which is available is delivered to the internal combustion engine for proper combustion, such that the power or torque delivered from the internal combustion engine system is keep intact or at least at the highest possible level.

According to an embodiment the second turbine is located downstream of the exhaust gas recirculation cooler.

According to an embodiment the second turbine is arranged to recover energy to the internal combustion engine. When recovering the energy to the internal combustion engine the energy is used for running of the internal combustion engine system, and to the vehicle.

According to an embodiment the second turbine is arranged to convert the recovered energy into mechanical energy. When recovering the energy as mechanical energy it may merely as an example, be delivered to the crank shaft of the internal combustion engine and may thus be used for propulsion of the internal combustion engine system and the vehicle.

According to an embodiment the second turbine is arranged to convert the recovered energy into electrical energy. When recovering the energy as electrical energy it may merely as an example, be delivered to a battery of the internal combustion engine and may thus be used for running of additional devices which are connected to, or located within the internal combustion engine system and the vehicle.

According to an embodiment the second turbine is operatively connected to the internal combustion engine through a gear train. A gear train is a well-known and efficient manner to deliver the energy from the second turbine to the internal combustion engine. It is thus simple to implement.

According to an embodiment the gear train is operatively connected to a torsional damping device. Hereby any power fluctuations from the internal combustion engine are dampened before they reach the second turbine. Such power fluctuation could otherwise damage the second turbine shaft joint. The power fluctuation originates from the fact that the power added to the common transmission from the combustion engine is discontinuous, each combustion implies a discrete step. The power fluctuation mainly originates from fluctuations in exhaust gas pressure from the internal combustion engine.

According to an embodiment the internal combustion engine further comprises a third turbine interacting with a second compressor, the third turbine and the second compressor being arranged to work at a lower pressure than the first turbine and the first compressor. To add a third turbine and a second compressor generally makes the internal combustion engine system into a dual stage turbocharged system. It may thus be possible to add even further amounts of compressed air to the internal combustion engine for improved combustion, and to recover even more energy through expansion in the turbines. The third turbine and the second compressor will work at respective lower pressures than the first turbine and the first compressor. This means that ambient air is firstly drawn into the second compressor and then into the first compressor before entering the internal combustion engine or the bleed air channel. The exhaust gases from the internal combustion engine will similarly firstly pass through the first turbine and secondly through the third turbine before entering any exhaust gas after treatment system or the like and passing out to the ambient. Advantageously, but not necessarily, an intercooler may be located between the second compressor and the first compressor.

According to an embodiment the internal combustion engine further comprises a turbocompound turbine having a gear train for recovering mechanical energy from the exhaust gases, the second turbine being operatively connected to the turbocompound turbine gear train. The turbocompound turbine will interact with the exhaust gases to recover energy therefrom. The turbocompound may come in addition to a third turbine, or as an alternative thereto. Preferably, but not necessarily, it will be located downstream of the first turbine.

According to an embodiment the second turbine is connected to a common gear train with the turbocompound turbine. When the internal combustion system is provide with both a second turbine and a turbocompound turbine, both could be connected to the internal combustion engine system through a gear train. When utilising the same gear train for both turbines, a compact system is achieved.

According to an embodiment bleed air in the bleed air channel and the exhaust gases in the exhaust system are held separated in the exhaust gas recirculation cooler. By holding the bleed air and the exhaust gases separate in the exhaust gas recirculation cooler they do not come into contact with each other. If they do not interact either than through heat exchange this way, the bleed air, which is fresh air from the ambient which has merely been compressed and possibly thus been increased in temperature, is not contaminated by the exhaust gases, which may contain combustion emissions that should be reduced or even better, be completely removed. Hereby the bleed air may be passed generally directly to the ambient after passing the second turbine. Otherwise it would have to be passed through any exhaust gas after treatment system for removal of emissions and that would have put unnecessary increased demands in any such exhaust gas after treatment system.

According to an embodiment the bleed air channel debouches in the exhaust system downstream of any exhaust gas after treatment system connected to the exhaust system. The bleed air is thus not placing larger demands on capacity of the exhaust gas after treatment system.

According to an embodiment the bleed air in the bleed air channel and the exhaust gases in the exhaust system are held separated until the bleed air is made to debouch in the exhaust system downstream of any exhaust gas after treatment system connected to the exhaust system.

According to an embodiment the internal combustion engine further comprises a waste heat recovery heat exchanger located in the exhaust system, and a waste heat recovery circuit having a waste heat recovery turbine for recovering energy from the exhaust gases. Until the exhaust gases originating from the internal combustion engine system are having the same temperature as the ambient air, there is a potential for recovering this increased temperature to use in the internal combustion engine system in any desired way. A question may be whether this increased temperature is high enough to be worth recovering. If there is a potential for recovering the increased temperature in a manner which is both efficient and does not impart too heavy investments in equipment in the internal combustion engine system it will be advantageous. This embodiment thus includes an additional waste heat recovery heat exchanger, such that the waste heat may be recovered in any desired way.

According to an embodiment the waste heat recovery heat exchanger is located downstream any exhaust gas after treatment system connected to the exhaust system. It may be advantageous to feed the exhaust gas after treatment system with exhaust gases having a raised temperature in order for at least parts of the exhaust gas after treatment system to function properly. Such devices as diesel particulate filters and selective catalytic reduction catalysts are known to operate within certain temperature intervals to deliver the filtering and catalytic effect. When placing the waste heat recovery heat exchanger downstream any such exhaust gas after treatment system the dual effect of maintaining the temperature of the exhaust gases in the exhaust gas after treatment system, and possibly even receiving further heat power from combustion or catalytic processes in the exhaust gas after treatment system to the waste heat recovery heat exchanger is achieved.

According to an embodiment the waste heat recovery turbine is arranged to con-vert the recovered energy into mechanical energy. Mechanical energy may be utilised i.a. as propulsive power in the internal combustion engine system.

According to an embodiment the waste heat recovery turbine is arranged to convert the recovered energy into electrical energy. Electrical energy may be utilised i.a. as charging power in any batteries in the internal combustion engine system.

According to an embodiment the waste heat recovery turbine is operatively connected to the internal combustion engine through a gear train. A gear train is a well-known and efficient manner to deliver the energy from the waste heat recovery turbine to the internal combustion engine. It is thus simple to implement.

According to an embodiment the waste heat recovery turbine is operatively connected to the same gear train as the second turbine. This further improves the compactness of the internal combustion engine system, since more devices may be using an already existing gear train.

According to an embodiment the internal combustion engine further comprises an engine control unit which is arranged to control the regulating valve.

According to an embodiment the engine control unit is arranged to control the regulating valve based on an air demand in the internal combustion engine.

According to an embodiment the engine control unit is arranged to control the regulating valve based on ambient air pressure. Other alternatives is e.g. ambient temperature.

According to a second aspect of the present disclosure a vehicle is disclosed which comprises an internal combustion engine according to any one of the embodiments which are disclosed above. The vehicle of this second aspect will generally receive the same advantages as the corresponding internal combustion engine system.

According to an embodiment the internal combustion engine is a diesel engine. Such internal combustion engines my i.a. run on diesel fuel and dimethyl ether, DME.

BRIEF DESCRIPTION OF THE DRAWINGS

An embodiment of the disclosure will now be described with the aid of the accompanying drawings, in which.

DETAILED DESCRIPTION

Figure 1:
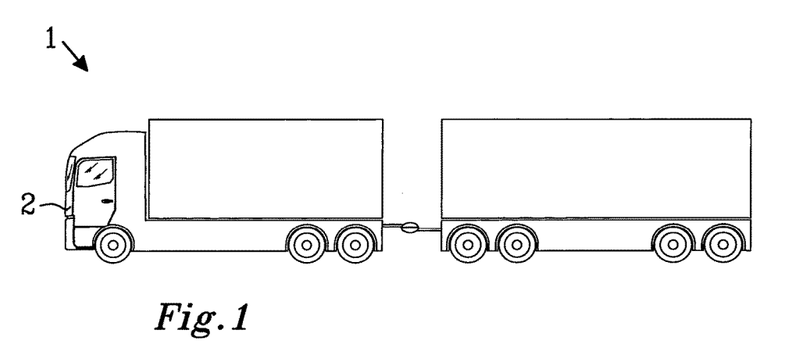
FIG. 1 is a schematic diagram of a heavy duty truck comprising an internal combustion engine system according to the present disclosure.

With reference to FIG. 1 a heavy duty truck 1 is disclosed for which an internal combustion engine system 2 of a kind disclosed in the present disclosure is advantageous. However, the internal combustion engine system 2 may well be implemented also in other types of vehicles, such as in busses, in light-weight trucks etc. Other applications may be marine applications, so called gensets etc. The internal combustion engine system 2 may be e.g. a diesel engine which as such may be running on several different types of fuel, such as diesel or dimethyl ether, DME. Other fuel types are contemplated.

Figure 2:
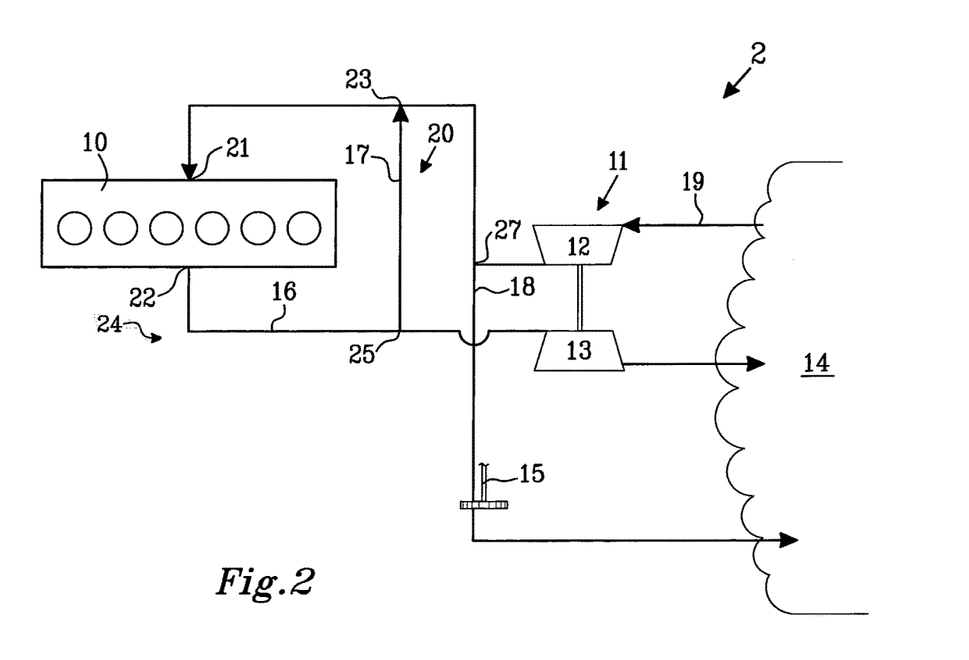
FIG. 2 is a schematic diagram of an internal combustion engine system according to the present disclosure.

Initially a description of the general concept of the present disclosure will be provided based on FIG. 2. Reference numeral 2 refers to the whole design as shown in FIG. 2 and named internal combustion engine system. The internal combustion engine system 2 comprises an internal combustion engine 10, an exhaust system 24, an exhaust gas recirculation circuit 20, and a turbocharger generally referred to with reference numeral 11. The turbocharger 11 comprises a first turbine 13 interacting with a first compressor 12 for charging air to the internal combustion engine 10. An exhaust gas recirculation passage 17 is arranged to divert exhaust gases from the internal combustion engine 10 upstream the first turbine 13 and to debouch the exhaust gases downstream the first compressor 12. A bleed air channel 18 is located to divert compressed air at a location in or downstream from the first compressor 12 and upstream of the internal combustion engine 10, and a second turbine 15 is arranged for receiving bleed air from the bleed air channel 18 to recover energy from the bleed air channel 18.

The first compressor draws fresh and uncompressed air from the ambient 14 through an intake passage 19, which passes through the first compressor 12 and goes further towards a bleed off point 27, where the bleed air channel 18 is diverted off from the intake passage 19. In the embodiment of FIG. 2 the bleed off point 27 is located downstream the first compressor 12, but could equally well be located generally within the first compressor 12. The intake passage 19 continues towards an exhaust gas recirculation entry point 23, where the exhaust gases, if any, are debouching into the intake passage 19. Finally, the intake passage 19 continues towards the internal combustion engine 10 where the compressed air is made to enter the internal combustion engine 10 though an intake manifold 21.

The exhaust gases, which are produced in not specifically shown combustion chambers within the internal combustion engine 10, exit the internal combustion engine 10 through an exhaust manifold 22 and passes through the exhaust system 24, which may have an exhaust passage 16 which ultimately releases the exhaust gases to the ambient 14. Before being released they firstly pass an exhaust gas recirculation exit point 25, where an amount of the exhaust gases may be made to exit the exhaust passage 16 and enter the exhaust gas recirculation passage 17. The exhaust gases then passes through the first turbine 13 where they are made to expand and drive the first turbine 13 which in turn is connected to and drives the first compressor 12. Finally the exhaust gases are passed out through the aft parts of the exhaust system 24 and leave the internal combustion engine system 2 through e.g. a tail pipe.

The part of the compressed air which is made to enter the bleed air channel 8 from the intake passage 19 at the bleed off point 27 is generally denominated bleed air. The energy which is contained in the bleed air is expanded and released in the second turbine 15 before it made to leave the internal combustion engine system 2 to the ambient air 14. The energy thus recovered in the second turbine 15 may be returned to the internal combustion engine system 2 in any manner found desirable. It is generally noted that the first compressor 12 is compressing air which is either delivered to the internal combustion engine 10 or to the bleed air channel 18. It is also noted that the bleed air is made not to come in contact with exhaust gases until the composition of the exhaust gases are found acceptable to enter the ambient 14.

Figure 3:
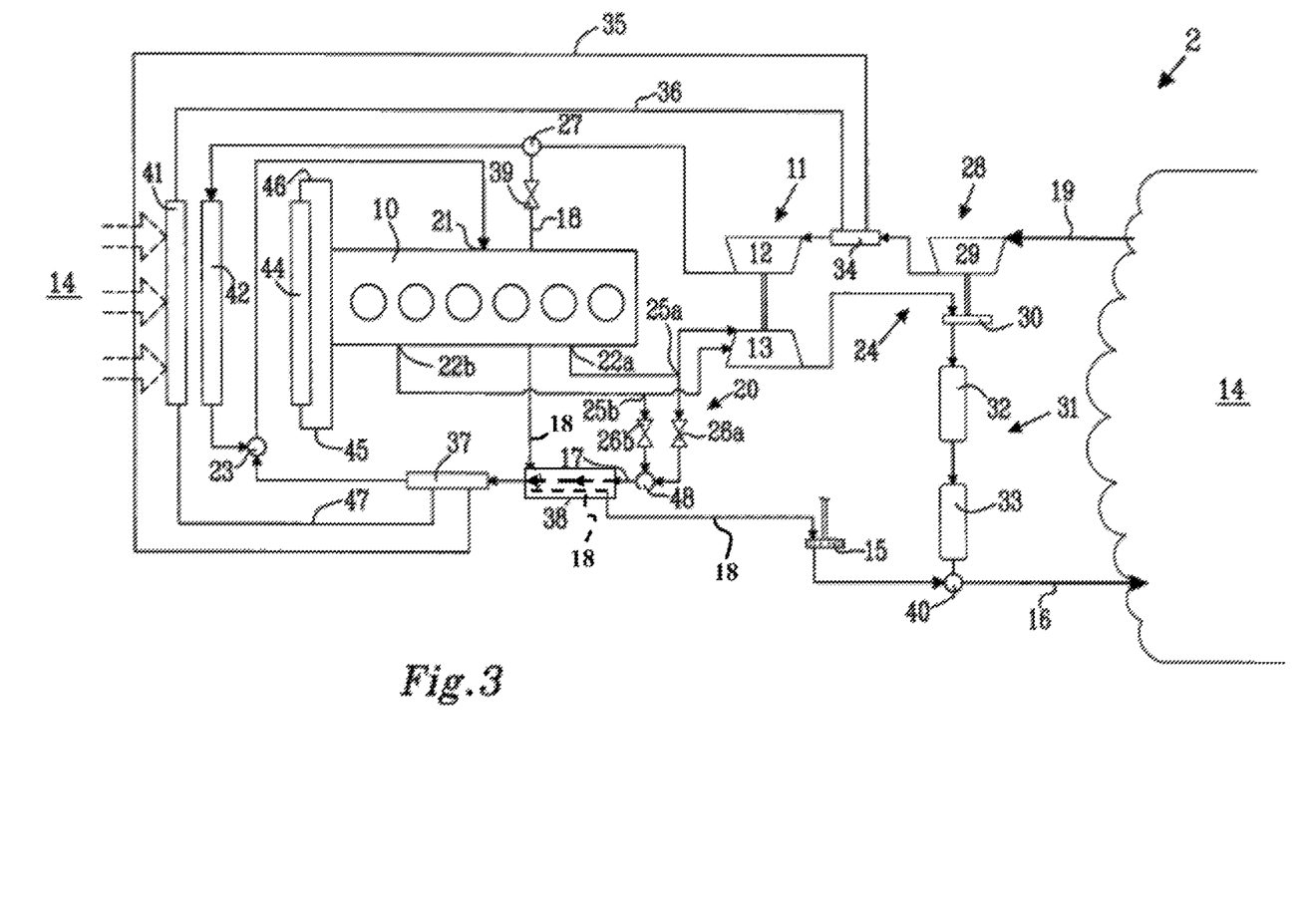
FIG. 3 is a schematic diagram of an internal combustion engine system according to a first alternative embodiment of the present disclosure.
Figure 4:
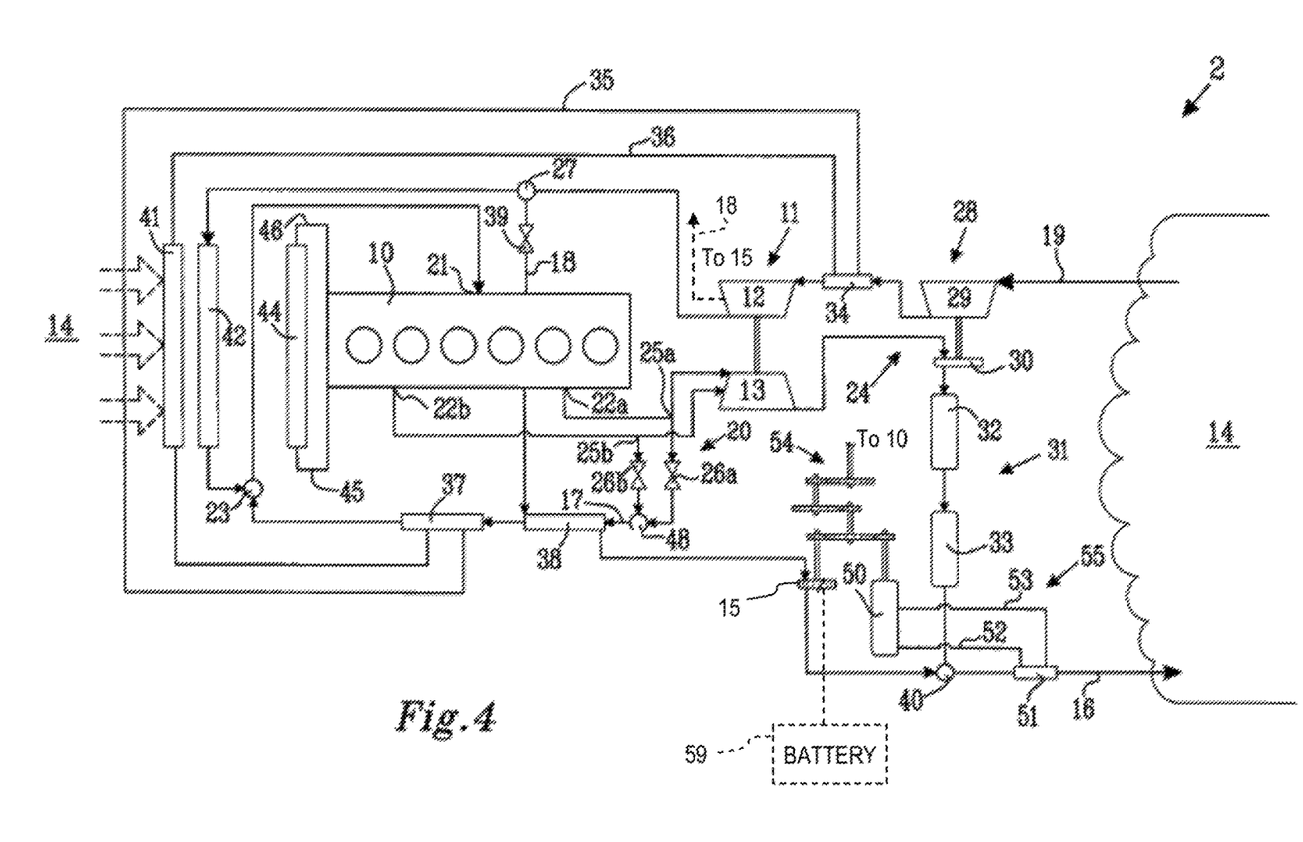
FIG. 4 is a schematic diagram of an internal combustion engine system according to a second alternative embodiment of the present disclosure.

FIGS. 3 and 4 disclose a first and a second alternative embodiment, respectively, of the present disclosure. Both of the first and the second embodiments have the general concept in common which is disclosed in FIGS. 1 and 2. The parts which have already been disclosed with reference to FIGS. 1 and 2 are hence not further discussed in the following unless there are further issues or relevant facts related to them.

In FIGS. 3 and 4 is should be noted that although the bleed air channel 18 seems to be located "behind" the internal combustion engine 10, it does not have any exchange with the internal combustion engine and the bleed air channel 18 only passes the internal combustion engine 10. The exact location in a real internal combustion engine system 2 may naturally be different.

FIG. 3 discloses the first alternative embodiment of the present disclosure. This embodiment includes generally a dual stage turbocharger, comprising the first turbo-charger 11 corresponding to the turbocharger 1 of the FIG. 2 embodiment already disclosed, and a second turbocharger 28 comprising a second compressor 29 interacting with a third turbine 30. The second turbocharger 28 is a low pressure turbocharger, and the first turbocharger 11 is a high pressure turbocharger, such that the air which is drawn from the ambient 14 firstly passes through, and is compressed to a certain degree in the second compressor 29, and secondly passes through, and is further compressed to a higher degree in the first compressor 12. Correspondingly, the exhaust gases firstly passes through the first turbine 13 and is expanded to a certain degree, and secondly passes through the third turbine 30 while being expanded to a higher degree.

Between the second and the first compressor, 29 and 12 respectively, an intermediate heat exchanger 34 is located in order to cool off the compressed air after the initial compressor step. The intermediate heat exchanger 34 is further connected through an input passage 36 and an output passage 35 to other parts of the internal combustion system 2, which will be described in more detail below.

The compressed air from the second and first compressors 29, 12 enters the internal combustion engine 10 at the intake manifold 21, after it has passed firstly a charge air cooler 42 and secondly the entry point for the exhaust gas recirculation entry point 23.

The internal combustion engine 10 itself has an engine cooling circuit comprising an engine cooling outlet passage 45, an engine cooling inlet passage 46 between which an engine cooler 44 is located. Such an engine cooling circuit is known in the art and not otherwise discussed further.

A head wind cooler 41 is connected to the intermediate heat exchanger 34 through the input passage 36, such that a cooling medium in the input passage 36 is cooled off through the passing wind in the head wind cooler 41, and is transported to the intermediate heat exchanger 34, where it is kept separate from the compressed air in other manners than an exchange of heat energy. The compressed air in the intake passage 19 is consequently cooled off, while heat energy thus removed is made to continue through the output passage 35 towards a low temperature exhaust gas recirculation cooler 37. The low temperature exhaust gas recirculation cooler 37 will in the following be called LT EGR cooler 37 for short. The LT EGR cooler 37 is finally closing this circuit by returning to the head wind cooler 41 through a passage 47. The cooling medium in this circuit is hence made to exchange heat with both the compressed air from the second compressor 29 and with exhaust gases from the internal combustion engine 10.

The engine cooler 44, the charge air cooler 42 and the head wind cooler 41 are all located at the front end of the internal combustion engine system 2 where it meets cool fresh air when the vehicle 1 is travelling on a road.

The exhaust gas recirculation circuit 20 is according to this embodiment slightly more complex than in the earlier described embodiment according to FIG. 2. The internal combustion engine 10 according to the embodiment of FIG. 3 is provided with two separate outlets 22a, 22b from the exhaust manifold 22, each one being connected to the first turbine 13. From each respective outlet 22a, 22b a respective exhaust gas recirculation exit point 25a, 25b are located in order to take off a respective desired amount of exhaust gases for recirculation in the exhaust gas recirculation circuit 20. In order to regulate the amount of recirculated gas in each part, a regulating valve 26a, 26b is placed on each part of the exhaust gas recirculation circuit 20. These regulating valves 26a, 26b may be either regulated collectively, or each by itself. The two parts of the exhaust gas recirculation circuit 20 are gathered at point 48 into a single exhaust gas recirculation passage 17. After the gathering point 48 the exhaust gases in the exhaust gas passage 17 then firstly enter a high temperature exhaust gas recirculation cooler 38, in the following called HT EGR cooler 38 for short, and secondly the LT EGR cooler 37 which has been already discussed. After having passed the LT EGR cooler 37 the exhaust gases continues and meets the compressed air at the exhaust gas recirculation entry point 23 before entering the internal combustion engine 10 through the intake manifold 21.

In the HT EGR cooler 38, which in fact is a heat exchanger, heat exchange takes place between the initially hot exhaust gases from the internal combustion engine 10 and the initially cool bleed air from the first compressor 12. There is no other contact between the exhaust gases and the bleed air than through heat exchange. The two flows of gases are consequently held separate within the HT EGR cooler 38.

In the LT EGR cooler 37, which in fact is a heat exchanger, heat exchange takes place between the initially still warm exhaust gases from the HT EGR cooler 38 and the initially cool cooling medium from the head wind cooler 41. There is no other contact between the exhaust gases and the cooling medium than through heat exchange. The flows of gases and cooling medium are consequently held separate within the LT EGR cooler 37.

The bleed air channel 18 comprises a bleed air regulating valve 39 located on the bleed air channel 18. The bleed air regulating valve 39 is adapted to regulate the amount of bleed air passing through the bleed air channel 18 between either generally fully closed, such that no bleed air is taken off at the bleed off point 27 from the intake passage 19, and open to such an extent that the internal combustion engine 10 receives appropriate amounts of compressed air from the intake passage 19, in order to provide the vehicle with adequate propulsion power. The bleed air regulating valve 39 may be regulated based on e.g. ambient air pressure, ambient air temperature, on air demand in the internal combustion engine 10, or on measures which correspond directly or indirectly thereto. Hereby the internal combustion engine system 2 may adapt the amount of compressed air delivered to the internal combustion engine 10 depending on ambient conditions.

The exhaust system 24 comprises an Exhaust After Treatment System, EATS 31.

The EATS 31 is located downstream of the third turbine 30 and the exhaust gases are made to pass the EATS 31 before entering the ambient 14. Downstream of the EATS 31 a collection point 40 is located in which the exhaust gases from the exhaust system 24 and the bleed air from the bleed air channel 18 are collected. The bleed air is made to enter the exhaust system 24 at the collection point 40 in order not to contaminate the fresh bleed air, and in order not to put unnecessary increased demands on the EATS 31.

The EATS comprises in this embodiment a Diesel Particulate Filter, DPF 33 and a Selective Catalytic Reduction catalyst, SCR 32, but could comprise any number of otherwise known components in any order which is found appropriate in combination with the vehicle and the fuel type.

The second alternative embodiment disclosed in FIG. 4 has all the featured disclosed also with regard to the first alternative embodiment in FIG. 3. The parts which have already been disclosed with reference to FIG. 3 are hence not further discussed in the following unless there are further issues or relevant facts connected with the features included.

FIG. 4 also discloses an additional Waste Heat Recovery system, a WHR system 55. The WHR system 55 comprises a Waste Heat Recovery heat exchanger, a WHR heat exchanger 51 located on the exhaust passage 16 for recovering any remaining heat energy in the exhaust gases. The WHR system 55 comprises an inlet passage 52 and an outlet passage 53 for a cooling medium, which cooling medium is made to deliver the recovered heat energy in a Waste Heat Recovery turbine, WHR turbine 50. The WHR turbine 50 is connected through a gear train 54 to a crank shaft (not shown) in the internal combustion engine 10. This way the remaining heat energy which is recovered by the WHR system 55 can be recovered as mechanical energy for propulsion of the vehicle.

In all of the above disclosed embodiments the second turbine may be connected to the internal combustion engine 10 for recovering energy. This is done in the second alternative embodiment through connection of the second turbine 15 to the gear train 54, which in turn is connected to the crank shaft of the internal combustion engine 10. By utilising the same gear train 54 in both the WHR system 55 and for the second turbine 15 a compact system is achieved.

The gear train 54, and/or any additional gear trains utilised in the internal combustion engine system 2 may be provided with a torsional damping device (Not Shown) in order to dampen any power fluctuations generated in the internal combustion engine 10.

Many alternative embodiments of the present disclosure may be contemplated without departing from the general idea thereof. For example, the relative locations of the coolers, i.e. the head wind cooler 41, the a charge air cooler 42 and the engine cooler 44 may be in a different order with regard to the axial direction of the vehicle, and thus not in the particular order which is disclosed in FIGS. 3 and 4. They also do not need to be located one behind the other in a consecutive order, but either vertically on top of each other, or horizontally adjacent each other, or a combination of these locations.

In both the first and the second alternative embodiments the bleed air in the bleed air channel 18 is made to take up heat energy from the exhaust gases in the HT EGR cooler 38 and the LT EGR cooler 37. Alternatively, the bleed air could be made to take up heat energy from any heat source in the internal combustion engine system 2 or the vehicle. Such a source of heat energy could be any waste heat source. A particular interest has been disclosed above in the excess heat included in the exhaust gases, but also other waste heat sources are contemplated, such as from a cooling system for a battery or battery pack, from an electrical motor, or from a generator etc.

As is the case in the FIG. 2 embodiment, the first and second alternative embodiments disclosed in FIGS. 3 and 4 could also be provided with only one outlet from exhaust manifold 22. In such a case there will be only one regulating valve 26 and no gathering point 48. This also means that only one entry point to the first turbine 13 is needed.

The regulating valve 26, or the two regulating valves 26a, 26b may be of other kinds than the ones discloses in the FIGS. 3 and 4. For example a regulating valve 26 which produces a backpressure in the internal combustion engine 10 may be one option.

The HT EGR cooler 38 and the LT EGR cooler 37 as well as the intermediate heat exchanger 34 may either one or all of them be coolers instead of heat exchangers, such that they are directly cooled by i.a. the ambient passing wind. In such a case they are likely not connected to a cooling circuit comprising a cooling medium in the way described in connection with FIGS. 3 and 4. The HT EGR cooler 38 and the LT EGR cooler 37 may also be connected to its own cooling circuit and not be connected to the intermediate heat exchanger 34. In fact, the intermediate heat exchanger 34 may be completely left out. In such a case the head wind cooler 41 is only connected to the LT EGR cooler 37.

There could also be only a single EGR cooler (or EGR heat exchanger) instead of the combination of a HT EGR cooler 38 and a LT EGR cooler 37. The total heat exchange effect, or in other words, cooling effect, is consequently achieved in this single EGR cooler. If there in such an embodiment also is no intermediate heat exchanger 34, there is no need for any head wind cooler 41 and not for any associated input passage 36 and output passage 35. Regardless of the presence of one or several EGR coolers, heat exchange between the bleed air in the bleed air channel 18 and the exhaust gases in the exhaust gas recirculation circuit 20 will take place such that the bleed air and the exhaust gases are kept separate for any other exchange than heat exchange.

The bleed air channel 18 does not need to be combined with the exhaust system 24, but the bleed air could be made to enter the ambient 14 directly from the bleed air channel 18, such as directly downstream of the second turbine 15.

It is advantageous, but not necessary that an Engine Control Unit (ECU), which is not shown in any one of the figures, which is adapted to control the internal combustion engine 10 also is adapted to control the internal combustion engine system 2, including any bleed air regulating valve 39 in the bleed air channel 18 and regulating valves 26, 26a, 26b in the exhaust gas recirculation circuit 20. The ECU may be adapted to regulate the bleed air regulating valve 39 based on either one or both of ambient air pressure and air demand in the internal combustion engine 10.

Although FIGS. 2 to 4 are depicted having an internal combustion engine 10 with a straight 6 cylinder engine, any type of cylinder configuration, such as V-type, or cylinder number, such as 4 cylinders, may be used in connection with the present disclosure.

The second turbine 15 and/or the WHR system 55 may alternatively be connected to separate gear trains for recovering of energy. It is also possible to connect the second turbine 15 and/or the WHR system 55 for recovering of electrical energy, e.g. to a battery 59 or battery pack. Such a battery or battery pack may be used as energy source for additional components in the internal combustion engine system 2 or in the vehicle, such as for starter motors, for fans or air conditioning system, but also for a combined propulsion system having also one or several electrical machines for propulsion of the vehicle.

As an alternative to the third turbine 30, or as a complement thereto, the internal combustion engine system 2 may be provided with a turbocompound turbine (not shown) which has a gear train for recovering mechanical energy from the exhaust gases. This gear train may preferably be the gear train 54 to which the second turbine 15 is connected, but it could also be a separate one. The advantage of the addition of a turbocompound turbine is that energy may be recovered from the exhaust gases for propulsion of the vehicle. If the turbocompound turbine is connected to the same gear train 54 as the second turbine 15, a compact internal combustion engine system 2 is achieved. Possibly, but not necessarily, an internal combustion engine system 2 which is provided with such a turbocompound turbine will not also be provided with a WHR system 55.

The alternative embodiments which have been disclosed above may be combined in any way which is found advantageous, unless anything else is explicitly stated, as long as the features of the main claims are fulfilled.

The invention claimed is:

1. An internal combustion engine system comprising:
   an internal combustion engine;
   an exhaust system;
   an exhaust gas recirculation circuit comprising an exhaust gas recirculation passage;
   a turbo-charger comprising a first turbine positioned in the exhaust system and interacting with a first compressor for charging air to the internal combustion engine;
   a bleed air channel which is located to divert compressed air away from the internal combustion engine at a location in or downstream from the first compressor and upstream of the internal combustion engine; and
   a second turbine arranged in the bleed air channel to receive the compressed air from the bleed air channel, wherein the compressed air from the bleed air channel is not mixed with unpurified exhaust gases upstream or downstream of the first turbine, the second turbine is configured to recover energy of the compressed air from the bleed air channel, and the exhaust gas recirculation passage is arranged to divert exhaust gas from the internal combustion engine upstream the first turbine and to debouch the exhaust gases downstream the first compressor.

2. The internal combustion engine system according to claim 1, wherein the bleed air channel is directed for heat exchange with a waste heat source originating from the internal combustion engine.

3. The internal combustion engine system according to claim 2, wherein the waste heat source is an exhaust gas heat source.

4. The internal combustion engine system according to claim 3, wherein the waste heat source is the exhaust gas recirculation circuit.

5. The internal combustion engine system according to claim 4, wherein the exhaust gas recirculation circuit comprises an exhaust gas recirculation cooler, and the bleed air channel is directed through the exhaust gas recirculation cooler for heat exchange therein with the exhaust gases.

6. The internal combustion engine system according to claim 5, wherein a regulating valve located on the bleed air channel for regulating an amount of the compressed air through the bleed air channel.

7. The internal combustion engine system according to claim 6, further comprising an engine control unit which is arranged, to control the regulating valve.

8. The internal, combustion engine system according to claim 6, wherein the engine control unit is connected to sensors arranged to indicate an air demand, in the internal combustion engine and arranged to control the regulating valve based on the air demand in the internal combustion engine.

9. The internal combustion engine system according to claim 8, wherein the engine control unit is connected to sensors arranged to indicate ambient air pressure and arranged to control the regulating valve based on ambient air pressure.

10. The internal combustion engine system according to claim 5, wherein the compressed air in the bleed air channel and the exhaust gases in the exhaust system are held separated in the exhaust gas recirculation cooler.

11. The internal, combustion engine system according to claim 10, wherein the compressed air in the bleed air channel and the exhaust gases in the exhaust system are held separated until the compressed air is made to debouch in the exhaust system downstream of any exhaust gas after treatment system connected to the exhaust system.

12. The internal combustion engine system according to claim 3, wherein the waste heat source is one or more of the exhaust system and an exhaust after treatment system connected to the exhaust system.

13. The internal combustion engine system according to claim 1, wherein the second turbine is located downstream of an exhaust gas recirculation cooler.

14. The internal combustion engine system according to claim 1, wherein the second turbine is arranged to recover energy to the internal combustion engine.

15. The internal combustion engine system according to claim 1, wherein the second turbine is arranged to convert the recovered energy into mechanical energy.

16. The internal combustion engine system according to claim 1, wherein the second turbine is arranged to convert the recovered energy into electrical energy.

17. The internal combustion engine system according to claim 1, wherein the second turbine is operatively connected to the internal combustion engine through a gear train.

18. The internal combustion engine system according to claim 17, wherein the waste heat recovery turbine is arranged to convert the recovered energy into mechanical energy, and wherein, the waste heat recovery turbine is operatively connected to the gear train through which the second turbine is operatively connected to the internal combustion engine.

19. The internal combustion engine system according to claim 1, further comprising a third turbine interacting with a second compressor, the third turbine and the second compressor being arranged to work at a lower pressure than the first turbine and the first compressor.

20. The internal combustion engine system according to claim 19, wherein the second turbine is connected to a gear train with the turbocompound turbine.

21. The internal combustion engine system according to claim 1, wherein the internal combustion engine system further comprises a turbocompound turbine having a gear train for recovering mechanical energy from the exhaust gases, the second turbine being operatively connected to the turbocompound turbine gear train.

22. The internal combustion engine system according to claim 1, wherein the bleed air channel debouches in the exhaust system down-stream of any exhaust gas after treatment system connected to the exhaust system.

23. The internal combustion engine system according to claim 1, further comprising a waste heat recovery heat exchanger located in the exhaust system, and a waste heat recovery circuit having a waste heat recovery turbine for recovering energy from the exhaust gases.

24. The internal combustion engine system according to claim 23, wherein the waste heat recovery heat exchanger is located downstream any exhaust gas after treatment system connected to the exhaust system.

25. The internal combustion engine system according to claim 23, wherein the waste-heat recovery turbine is arranged to convert the recovered energy into mechanical energy.

26. The internal combustion engine system according to claim 23, wherein the waste heat recovery turbine is arranged to convert the recovered energy into electrical energy.

27. The internal combustion engine system according to claim 25, wherein the waste heat recovery' turbine is operatively connected to the internal combustion engine through a gear train.

28. A vehicle comprising an internal combustion engine system,
    wherein the internal combustion engine system further comprising:
        an internal combustion engine;
    an exhaust system;
    an exhaust gas recirculation circuit comprising an exhaust gas recirculation passage;
    a turbo-charger comprising a first turbine positioned in the exhaust system and interacting with a first compressor for charging air to the internal combustion engine;
    a bleed air channel diverting compressed air away from the internal combustion engine at a location in or downstream from the first compressor and upstream of the internal combustion engine; and
    a second turbine arranged in the bleed air channel to receive the compressed air from the bleed air channel,
        wherein the compressed air from the bleed air channel is not mixed with unpurified exhaust gases upstream or downstream of the first turbine, the second turbine is configured to recover energy of the compressed air from the bleed air channel, and the exhaust gas recirculation passage is arranged to divert exhaust gas from the internal combustion engine upstream the first turbine and to debouch the exhaust gases downstream the first compressor.

29. The vehicle according to claim 28, wherein the internal combustion engine is a diesel engine.

* * * * *